United States Patent
Crawford et al.

(10) Patent No.: US 9,250,818 B2
(45) Date of Patent: *Feb. 2, 2016

(54) TRANSFERRING LEARNING METADATA BETWEEN STORAGE SERVERS HAVING CLUSTERS VIA COPY SERVICES OPERATIONS ON A SHARED VIRTUAL LOGICAL UNIT THAT STORES THE LEARNING METADATA

(71) Applicant: International Business Machines Corporation, Armonk, NY (US)

(72) Inventors: Joshua J. Crawford, Tucson, AZ (US); Benjamin J. Donie, Chandler, AZ (US); Andreas B. Koster, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,953

(22) Filed: Oct. 20, 2014

(65) Prior Publication Data

US 2015/0039845 A1 Feb. 5, 2015

Related U.S. Application Data

(63) Continuation of application No. 13/926,913, filed on Jun. 25, 2013, now Pat. No. 8,904,123, which is a continuation of application No. 13/463,275, filed on May 3, 2012, now Pat. No. 8,495,313, which is a continuation of application No. 12/887,281, filed on Sep. 21, 2010, now Pat. No. 8,539,175.

(51) Int. Cl.
*G06F 12/00* (2006.01)
*G06F 3/06* (2006.01)

(52) U.S. Cl.
CPC ............ *G06F 3/0619* (2013.01); *G06F 3/0604* (2013.01); *G06F 3/065* (2013.01); *G06F 3/0607* (2013.01); *G06F 3/0632* (2013.01); *G06F 3/0676* (2013.01); *G06F 3/0685* (2013.01)

(58) Field of Classification Search
None
See application file for complete search history.

(56) References Cited

U.S. PATENT DOCUMENTS 7,668,874 B2 2/2010 Kawamura et al.
8,225,159 B1 7/2012 Coatney et al.
(Continued)

OTHER PUBLICATIONS

Preliminary Amendment filed May 3, 2012 for U.S. Appl. No. 12/887,281, filed Sep. 21, 2010, pp. 1-16, by inventors J.J. Crawford, B.J. Donie, and A.B.M. Koster.
(Continued)

*Primary Examiner* — Midys Rojas
(74) *Attorney, Agent, or Firm* — Rabindranath Dutta; Konrad Raynes Davda & Victor LLP

(57) ABSTRACT

A virtual logical unit that stores learning metadata is allocated in a first storage server having a first plurality of clusters, wherein the learning metadata indicates a type of storage device in which selected data of the first plurality of clusters of the first storage server are stored. A copy services command is received to copy the selected data from the first storage server to a second storage server having a second plurality of clusters. The virtual logical unit that stores the learning metadata is copied, from the first storage server to the second storage server, via the copy services command. Selected logical units corresponding to the selected data are copied from the first storage server to the second storage server, and the learning metadata is used to place the selected data in the type of storage device indicated by the learning metadata.

15 Claims, 7 Drawing Sheets

(56) References Cited

U.S. PATENT DOCUMENTS

| | | |
|---|---|---|
| 2006/0095405 A1 | 5/2006 | Anderson et al. |
| 2010/0325355 A1 | 12/2010 | Kezuka et al. |
| 2012/0072640 A1 | 3/2012 | Crawford et al. |
| 2012/0221777 A1 | 8/2012 | Crawford et al. |
| 2013/0290624 A1 | 10/2013 | Crawford et al. |

OTHER PUBLICATIONS

Office Action dated Jan. 28, 2013, pp. 1-17, for U.S. Appl. No. 12/887,281, filed Sep. 21, 2010, pp. 1-16, by inventors J.J. Crawford, B.J. Donie, and A.B.M. Koster.

Response dated Apr. 26, 2013, pp. 12, to Office Action dated Jan. 28, 2013, pp. 1-17, for U.S. Appl. No. 12/887,281, filed Sep. 21, 2010, pp. 1-16, by inventors J.J. Crawford, B.J. Donie, and A.B.M. Koster.

Notice of Allowance dated May 10, 2013, pp. 1-10, for U.S. Appl. No. 12/887,281, filed Sep. 21, 2010, pp. 1-16, by inventors J.J. Crawford, B.J. Donie, and A.B.M. Koster.

Preliminary Amendment filed May 3, 2012, pp. 1-16, for U.S. Appl. No. 13/463,275, filed May 3, 2012, by inventors J.J. Crawford, B.J. Donie, and A.B.M. Koster.

Office Action dated Oct. 2, 2012, pp. 1-13, for U.S. Appl. No. 13/463,275, filed May 3, 2012, by inventors J.J. Crawford, B.J. Donie, and A.B.M. Koster.

Response dated Jan. 2, 2013, pp. 1-11, to Office Action dated Oct. 2, 2012, pp. 1-13, for U.S. Appl. No. 13/463,275, filed May 3, 2012, by inventors J.J. Crawford, B.J. Donie, and A.B.M. Koster.

Notice of Allowance dated Mar. 25, 2013, pp. 1-6, for U.S. Appl. No. 13/463,275, filed May 3, 2012, by inventors J.J. Crawford, B.J. Donie, and A.B.M. Koster.

Office Action dated Sep. 13, 2013, pp. 17, for U.S. Appl. No. 13/926,913, filed Jun. 25, 2013.

Response dated Dec. 13, 2013, pp. 14, to Office Action dated Sep. 13, 2013, pp. 17, for U.S. Appl. No. 13/926,913, filed Jun. 25, 2015.

Final Office Action dated Apr. 10, 2014, pp. 13, for U.S. Appl. No. 13/926,913, filed Jun. 25, 2013.

Response dated Jul. 2, 2014, pp. 12, to Final Office Action dated Apr. 10, 2014, pp. 13, for U.S. Appl. No. 13/926,913, filed Jun. 25, 2013.

Notice of Allowance dated Jul. 18, 2014, pp. 8, for U.S. Appl. No. 13/926,913, filed Jun. 25, 2013.

TRANSFERRING LEARNING METADATA BETWEEN STORAGE SERVERS HAVING CLUSTERS VIA COPY SERVICES OPERATIONS ON A SHARED VIRTUAL LOGICAL UNIT THAT STORES THE LEARNING METADATA

CROSS-REFERENCE TO RELATED APPLICATIONS

This application is a continuation of application Ser. No. 13/926,913 filed Jun. 23, 2013, wherein application Ser. No. 13/926,913 is a continuation of application Ser. No. 13/463,275 filed on May 3, 2012, wherein application Ser. No. 13/463,275 is a continuation of application Ser. No. 12/887,281 filed on Sep. 21, 2010, wherein application Ser. No. 13/926,913, application Ser. No. 13/463,275 and application Ser. No. 12/887,281 are incorporated herein by reference in their entirety.

BACKGROUND

1. Field

The disclosure relates to a method, a system, and a computer program product for transferring learning metadata between storage servers having clusters, via copy services operations on a shared virtual logical unit that stores the learning metadata.

2. Background

In certain storage system environments, a plurality of storage servers may be coupled to each other, wherein one or more of the storage servers may include a plurality of storage clusters. Learning mechanisms may be employed to gather information about data that is stored in such storage system environments. However, information gathered by such learning mechanisms may be lost during failure of storage clusters and during servicing of storage clusters. In certain systems, a cross cluster e-mail of information about data may be used to retain certain information gathered by learning mechanisms. In certain situations, such e-mails may impact other vital mail services. Other mechanisms, such as storing the gathered information in global data may impact global data read/write which may be a critical service in certain storage system environments.

SUMMARY OF THE PREFERRED EMBODIMENTS

Provided are a method, a system, and a computer program product in which a virtual logical unit that stores learning metadata is allocated in a first storage server having a first plurality of clusters, wherein the learning metadata indicates a type of storage device in which selected data of the first plurality of clusters of the first storage server are stored. A copy services command is received to copy the selected data from the first storage server to a second storage server having a second plurality of clusters. The virtual logical unit that stores the learning metadata is copied, from the first storage server to the second storage server, via the copy services command Selected logical units corresponding to the selected data are copied from the first storage server to the second storage server, and the learning metadata is used to place the selected data in the type of storage device indicated by the learning metadata.

In further embodiments, the type of storage device is a solid state disk, wherein by indicating the type of storage device via the learning metadata the selected data is placed in a selected solid state disk in the second storage server instead of being placed in a magnetic disk in the second storage server.

In yet further embodiments, the learning metadata additionally indicates how the selected data is physically placed in different storage areas of the type of storage device indicated by the learning metadata, wherein the learning metadata also indicates constraints on read and write access times for the selected data, and wherein while placing the selected data in the type of storage device indicated by the learning metadata, the selected data is also placed in a manner such that the constraints on the read and write access times are satisfied.

In additional embodiments, the first storage server has a first cluster and a second cluster, wherein the first cluster exclusively controls a first set of logical units and the second cluster exclusively controls a second set of logical units. Access is allowed to the virtual logical unit that stores the learning metadata to both the first cluster and the second cluster. In response to a failure of the second cluster, data stored in the second set of logical units is reallocated to the first cluster, wherein placement of the reallocated data in storage devices conforms to constraints provided by the learning metadata stored in the virtual logical unit.

In yet additional embodiments, the copy services command is a synchronous copy services command that allows copying of selected logical units from one storage server to another, and the virtual logical volume that stores the learning metadata is not accessible to customers that store customer data in the first and the second storage servers.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments create a special volume that contains learning metadata generated by learning mechanisms. Then copy services mechanisms are to synchronize this learning metadata across clusters or across storage servers.

Exemplary Embodiments

Figure 1:
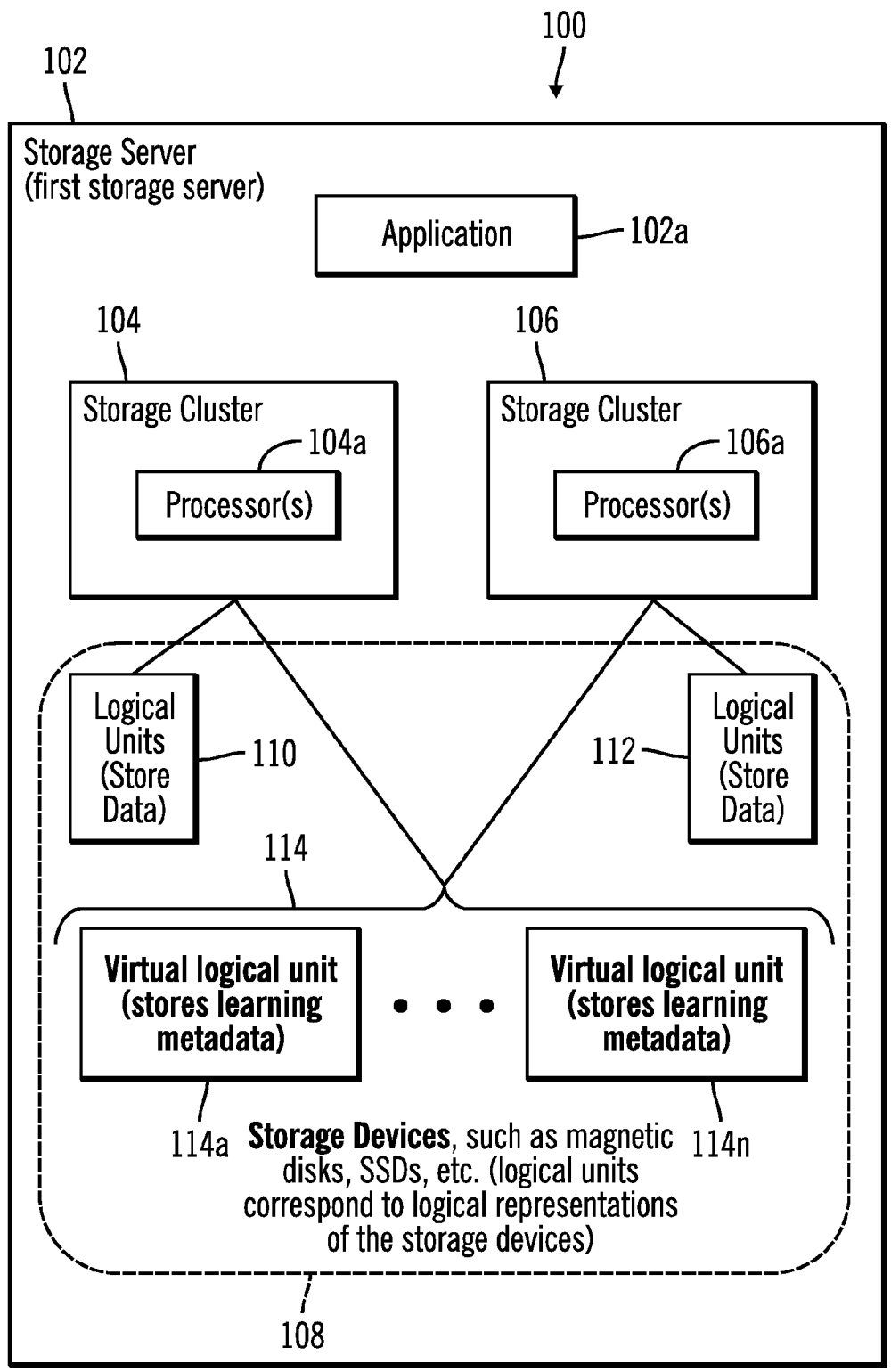
FIG. 1 illustrates a block diagram of a computing environment that includes a first storage server having a plurality of storage clusters that are coupled to a plurality of storage devices, in accordance with certain embodiments.

FIG. 1 illustrates a block diagram of a computing environment 100 that includes a first storage server 102 that controls a plurality of storage clusters 104, 106 that are coupled to a plurality of storage devices 108, in accordance with certain embodiments. While only two storage clusters 104 and 106 are shown in FIG. 1, in alternative embodiments there may be more than two storage clusters. An application 102a that executes in the storage server 102 may be used by the storage server 102 to control the storage clusters 104, 106 and to perform other operations, such as copy services operations. Processors 104a, 106a may execute computer-readable code within the storage clusters 104, 106 to perform operations.

The first storage server 102 and the storage clusters 104, 106 may be any suitable devices including those presently known in the art, such as, a personal computer, a workstation, a server, a mainframe, a hand held computer, a palm top computer, a telephony device, a network appliance, a blade computer, a storage server, a storage controller, etc. The storage devices 108 may comprise direct access storage devices (DASD), optical devices, solid state disks (SSD), magnetic disks, sequential storage devices, etc. The coupling of the storage clusters 104, 106 to the plurality of storage devices 108 may be over a direct link, over a common bus system, or over a network, wherein the network may be any network known in the art, such as the Internet, an intranet, a Local area network (LAN), a Storage area network (SAN), a Wide area network (WAN), a wireless network, etc. In certain embodiments, the storage server 102 of FIG. 1 may be a cloud component part included in a cloud computing environment.

The storage areas found in storage media present within the storage devices 108 may be represented by a plurality of logical units (LUN), such as exemplary logical units 110, 112, 114 shown in FIG. 1. A logical unit is a logical representation of a storage area of a storage medium that may be found within an exemplary storage device.

In FIG. 1, logical units 110 store data exclusively for the storage cluster 104, whereas logical units 112 storage data exclusively for the storage cluster 106. The logical units 114 may be referred to as virtual logical units 114a . . . 114n, and in certain embodiments the virtual logical units 114a . . . 114n may be shared between the storage clusters 104, 106, and may store learning metadata.

Figure 2:
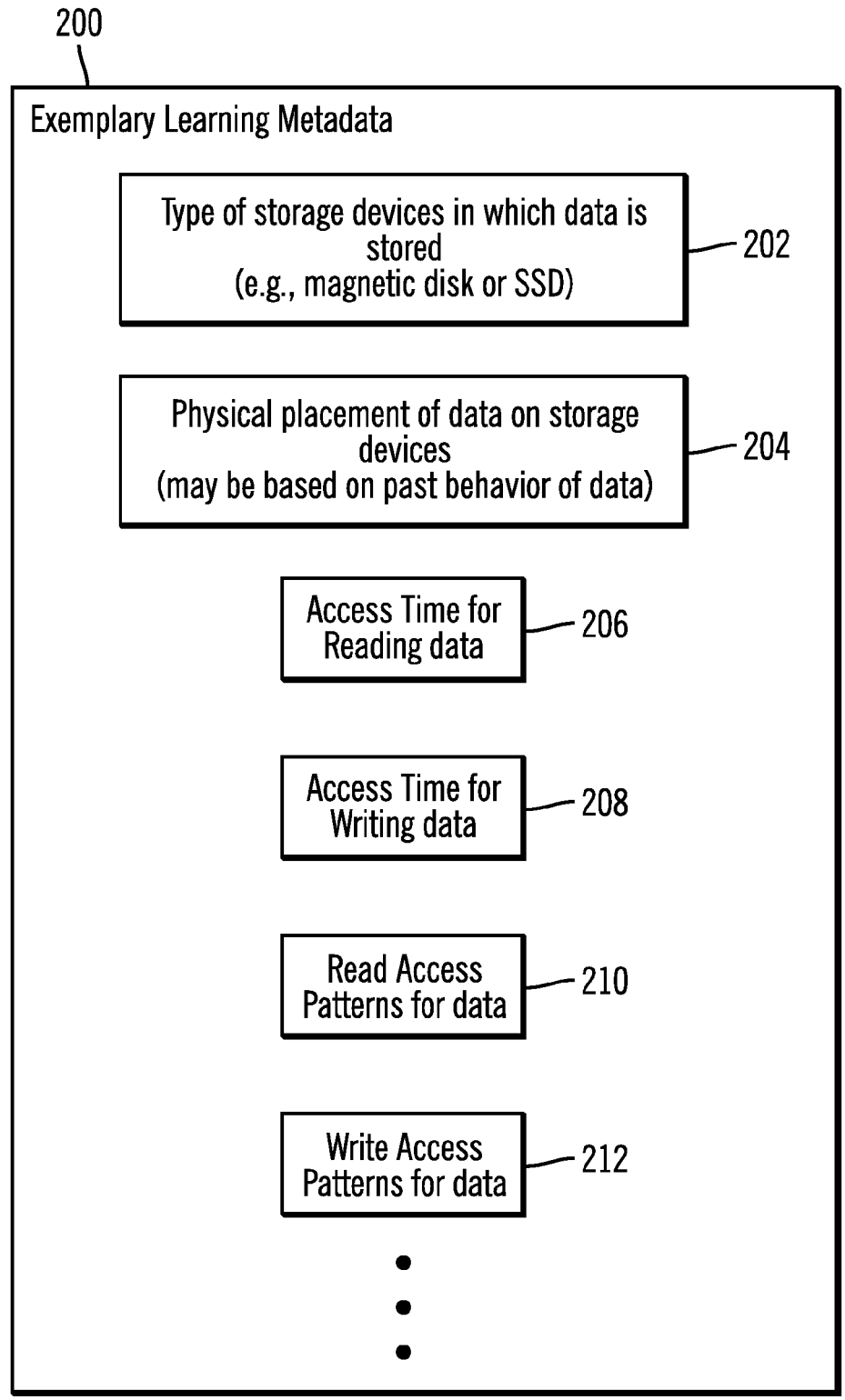
FIG. 2 illustrates a block diagram that shows exemplary learning metadata, in accordance with certain embodiments.

FIG. 2 illustrates a block diagram that shows exemplary learning metadata 200, in accordance with certain embodiments. The exemplary learning metadata 200 is information about data. In certain embodiments, the virtual logical units 114a . . . 114n of FIG. 1 may store the exemplary learning metadata 200, wherein the exemplary learning metadata 200 may comprise information about data stored in the logical units 110, 112 shown in FIG. 1.

The exemplary learning metadata 200 may include the type of storage device in which data is stored (reference numeral 202). For example, the exemplary learning metadata 200 may include information on whether the data is stored in magnetic disks or on solid state disks. If data is stored on solid state disks in the first storage server 102 then the data may be accessible faster in comparison to the data that is stored on magnetic disks. When the data is copied over from the first storage server 102 to a second storage server by copying the logical units 110, 112, then in certain embodiments the virtual logical units 114a . . . 114n that store the learning metadata are also copied over from the first storage server 102 to the second storage server, such that the second storage server has information that the data is stored on solid state disks. The second storage server may then store the data on solid state disks, such that at least the time to access the data in the second storage server is comparable to the time to access the data in the first storage server.

Other information stored in the exemplary learning metadata 200 may include information on the physical placement of data on storage devices (reference numeral 204). For example, certain data may be placed in the beginning of a linearly accessible storage medium, such as a tape in a storage device. The placement of data in favorable locations for ease of access may depend on past access patterns of the data. Other information that may be stored in the exemplary learning metadata 200 may include access time for reading data (reference numeral 206), access time for writing data (reference numeral 210), read access patterns for data (reference numeral 210), and write access patterns for data (reference numeral 212).

Figure 3:
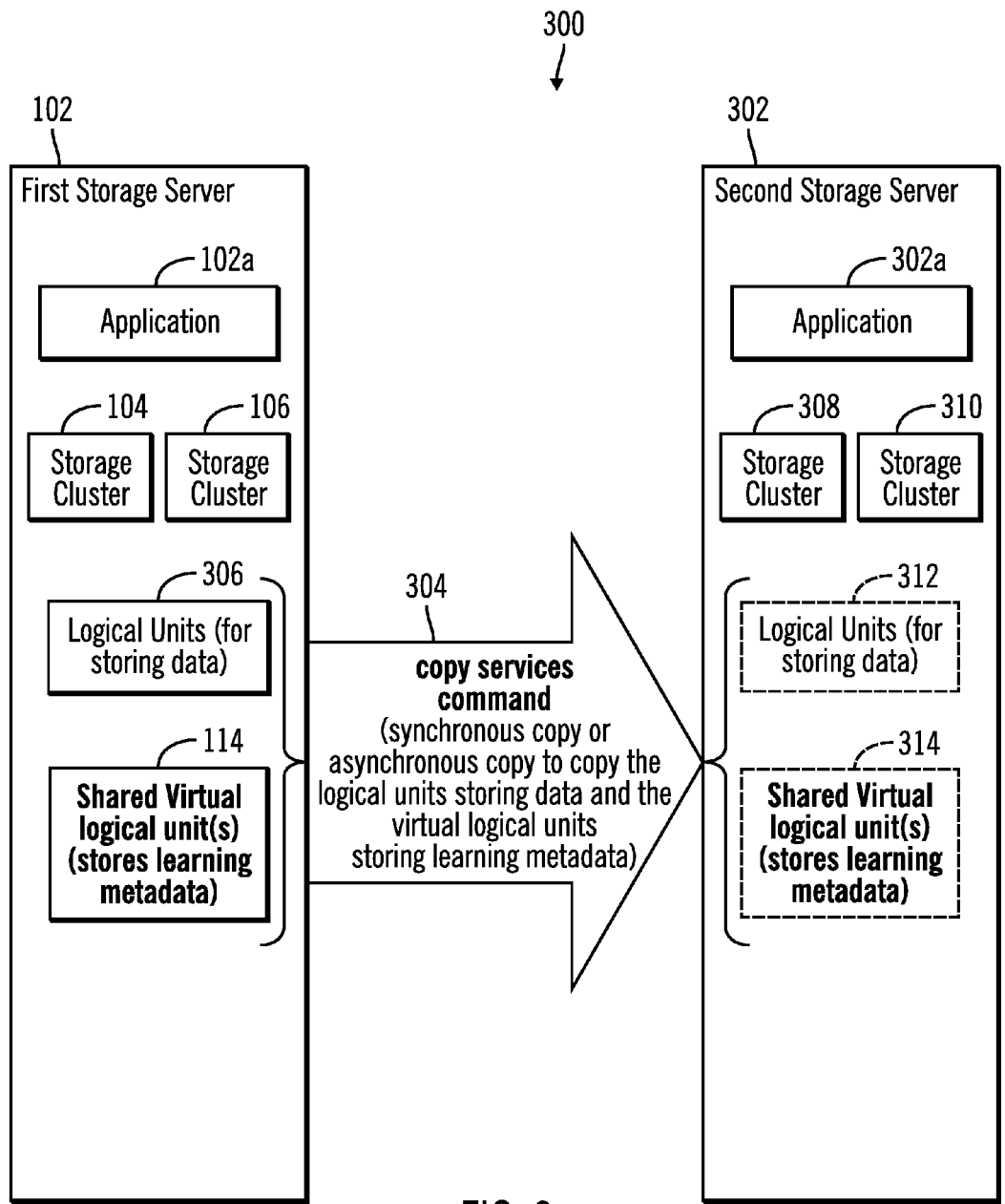
FIG. 3 illustrates a block diagram that shows a first storage server and the second storage server in which a copy services command is used to copy a virtual logical unit having learning metadata from the first storage server to the second storage server, in accordance with certain embodiments.

FIG. 3 illustrates a block diagram of a computing environment 300 that shows a first storage server 102 and a second storage server 302, in accordance with certain embodiments. In the computing environment 300, a copy services command 304 is used to copy a virtual logical unit 114 having learning metadata from the first storage server 102 to the second storage server 302 while copying the logical units 306 that store data, from the first storage server 102 to the second storage server 302. In certain embodiments, the copy services command 304 may be a synchronous copy services command and in other embodiments the copy services command may be an asynchronous copy services command.

The second storage server 302 controls a plurality of storage clusters 308, 310 via an application 302a, and the copy services command 304 copies the logical units 306, such that logical units 312 for storing data are created in the second storage server 302. The copy service command 304 also copies the virtual logical units 114 such that virtual logical units 314 for storing data are created in the second storage server 302, and shared among the storage clusters 308, 310

Figure 4:
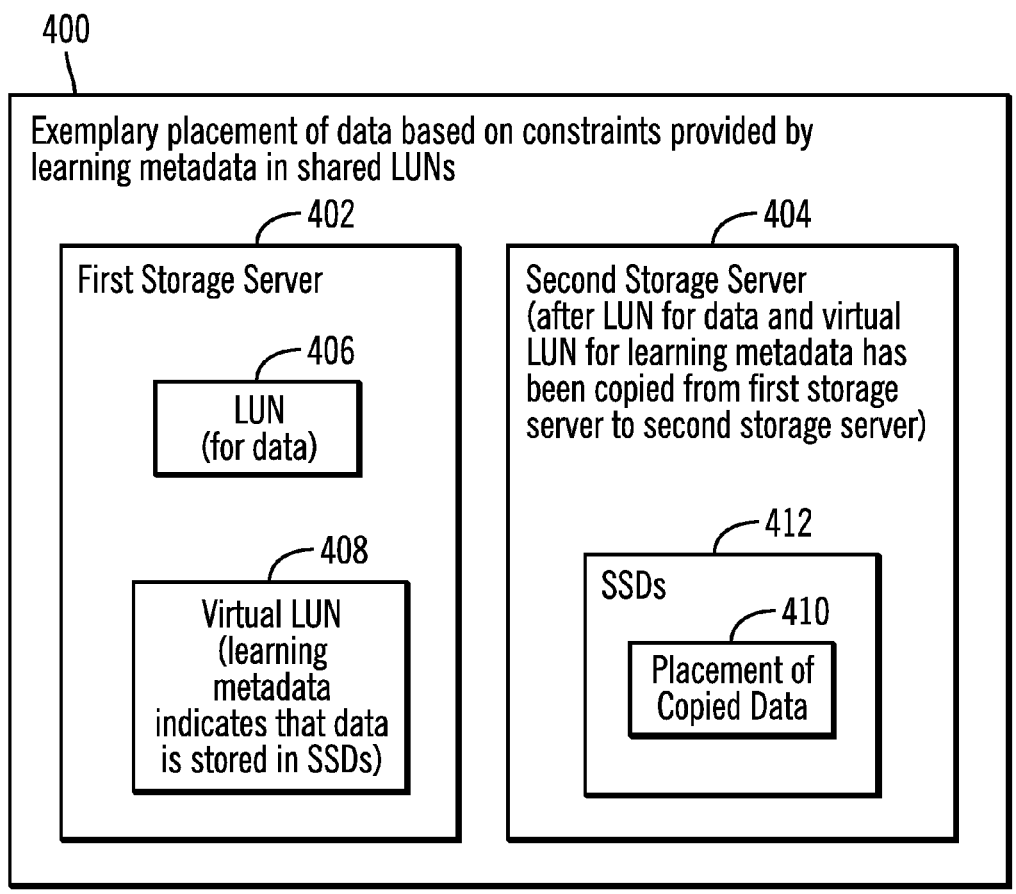
FIG. 4 illustrates block diagram that shows an exemplary placement of data based on constraints provided by learning metadata in shared logical units, in accordance with certain embodiments.

FIG. 4 illustrates block diagram 400 that shows an exemplary placement of data based on constraints provided by learning metadata in shared logical units, in accordance with certain embodiments. In an exemplary first storage server 402, logical units (LUN) 406 store data, and virtual LUNs 408 store learning metadata that indicates that the data is stored in solid state disks. In response to a copy services operation, after LUNs 406 for data and virtual LUNs 408 for metadata have been copied to the second storage server 404, the copied data 410 is placed in solid state disks 412 in the second storage server 404, in accordance with the indications provided in the learning metadata.

Figure 5:
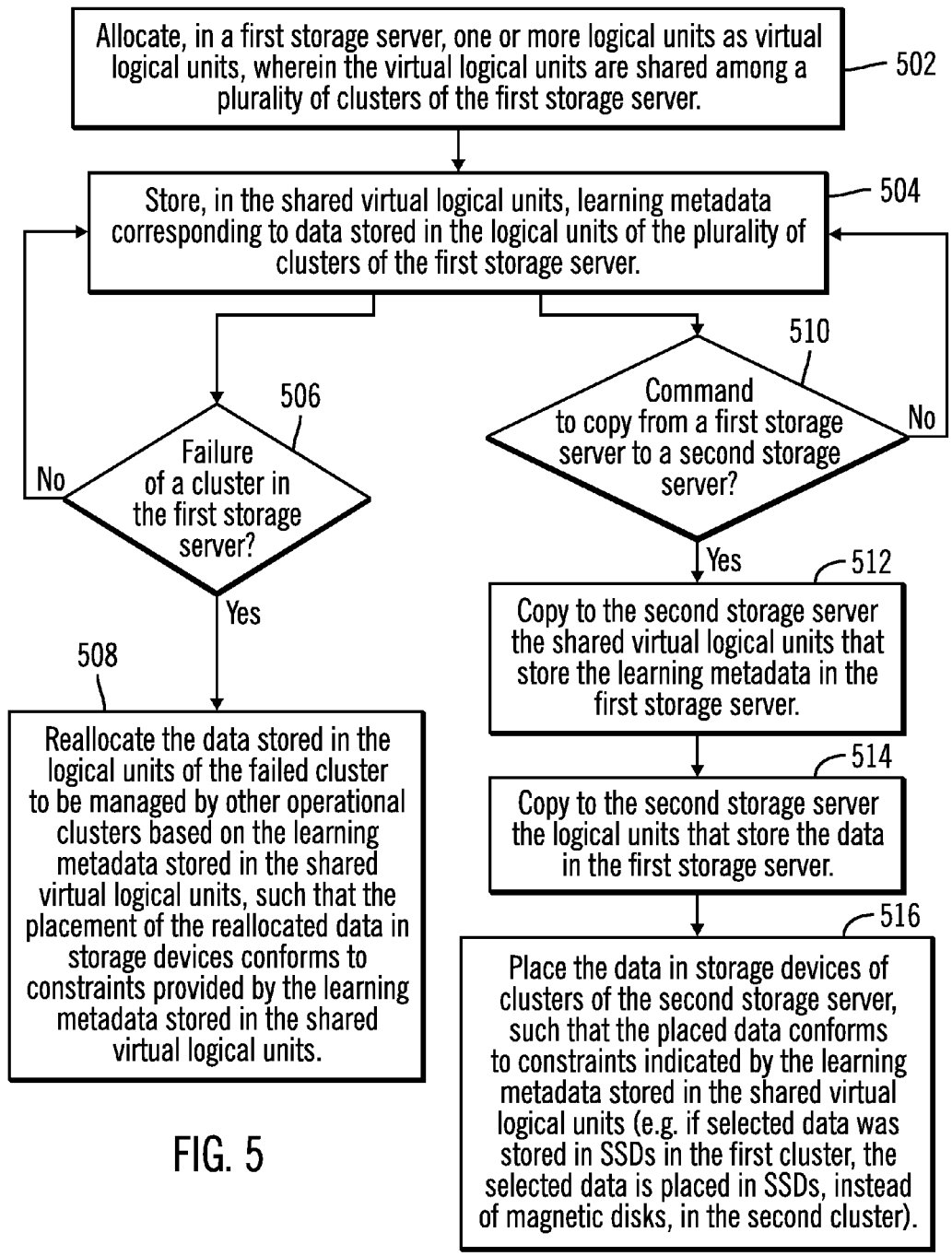
FIG. 5 illustrates a flowchart that shows first operations, in accordance with certain embodiments.

FIG. 5 illustrates a flowchart that shows first operations, in accordance with certain embodiments. The first operations shown in FIG. 5 may be implemented in the computing environments 100 and 300 shown in FIGS. 1 and 3. The first operations may be performed by processors present within the computing environments 100 and 300.

Control starts in block 502 in which one or more logical units 114a . . . 114n are allocated as virtual logical units 114 in a first storage server 102, wherein the virtual logical units 114 are shared among a plurality of clusters 104, 106 of the first storage server 102. Control proceeds to block 504 in which the shared virtual logical units 114 store learning metadata corresponding to data stored in the logical units 110, 112 of the plurality of clusters 104, 106 of the first storage server 102.

From block 504, control may proceed either to block 506 or block 510. At block 506, a determination is made as to whether a failure of a cluster has occurred in the first storage server 102. If so, control proceeds to block 508 in which the data stored in the logical units of the failed cluster are reallocated to be managed by other operational clusters based on the learning metadata stored in the shared virtual logical units 114, such that the placement of the reallocated data in storage devices 108 conforms to constraints provided by the learning metadata stored in the shared virtual logical units 114. If not (i.e., "No" branch from block 506), control returns to block 504 from block 506.

At block 510 a determination is made as to whether a command to copy from a first storage server 102 to a second storage server 302 has been received. If so, the copy services command 304 copies (at block 512) to the second storage server 302 the shared virtual logical units 114 that store the learning metadata in the first storage server 102. The copy services command 304 also copies (at block 514) to the second storage server 302 the logical units 306 that store the data in the first storage server 102. In certain embodiments, the data is placed (at block 516) in storage devices of storage clusters 308, 310 of the second storage server 302, such that the placed data conforms to constraints indicated by the learning metadata stored in the shared virtual logical units 114. For example, if selected data was stored in SSDs in the first cluster 102, the selected data is placed in SSDs, instead of magnetic disks, in the second cluster 302. If no command to copy from the first storage server 102 to the second storage server 302 has been received at block 510, control returns to block 504.

Figure 6:
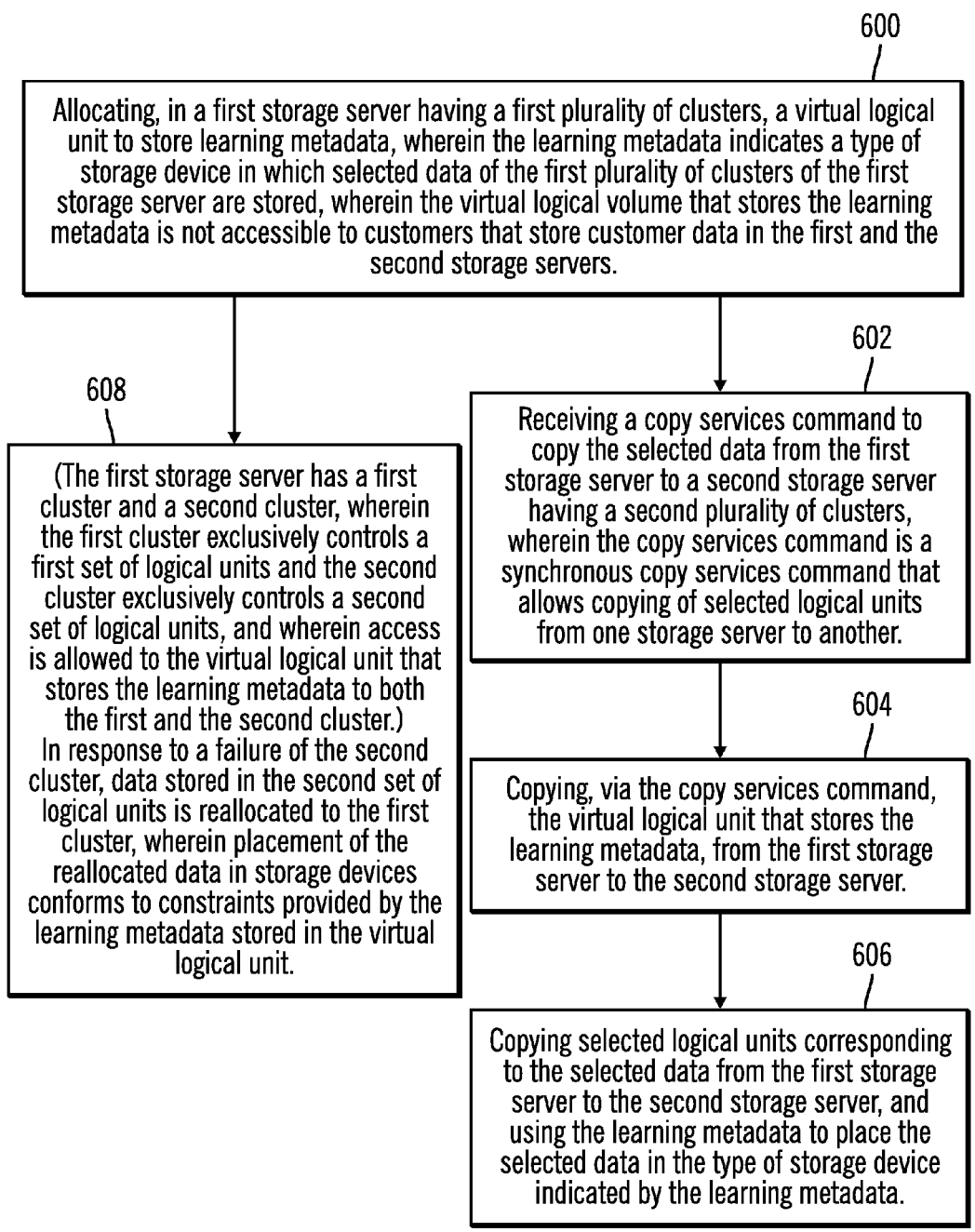
FIG. 6 illustrates a flowchart that shows second operations, in accordance with certain embodiments.

FIG. 6 illustrates a flowchart that shows second operations, in accordance with certain embodiments. The second operations shown in FIG. 6 may be implemented in the computing environments 100 and 300 shown in FIGS. 1 and 3. The second operations may be performed by processors present within the computing environments 100 and 300.

Control starts at block 600 in which a virtual logical unit 114 that stores learning metadata is allocated in a first storage server 102 having a first plurality of clusters 104, 106, wherein the learning metadata indicates a type of storage device in which selected data of the first plurality of clusters of the first storage server 102 are stored. In certain embodiments, the virtual logical volume that stores the learning metadata is not accessible to customers that store customer data in the first storage server 102 and the second storage server 302.

A copy services command 304 is received (at block 602) to copy the selected data from the first storage server 102 to a second storage server 302 having a second plurality of clusters 308, 310. In certain embodiments, the copy services command 304 is a synchronous copy services command that allows copying of selected logical units from one storage server to another. In alternative embodiments, the copy services command 304 is an asynchronous copy services command that allows copying of selected logical units from one storage server to another.

The virtual logical unit 114 that stores the learning metadata is copied (at block 604), from the first storage server 102 to the second storage server 302, via the copy services command 304. Selected logical units 306 corresponding to the selected data are copied (at block 606) from the first storage server 102 to the second storage server 302, and the learning metadata is used to place the selected data in the type of storage device indicated by the learning metadata.

In certain embodiments, control may also proceed from block 600 to block 608, in which the first storage server 102 has a first cluster 104 and a second cluster 106, wherein the first cluster 104 exclusively controls a first set of logical units 110 and the second cluster 106 exclusively controls a second set of logical units 112, and wherein access is allowed to the virtual logical unit 114 that stores the learning metadata to both the first cluster 104 and the second cluster 106. In response to a failure of the second cluster 106, data stored in the second set of logical units 112 is reallocated to the first cluster 104, wherein placement of the reallocated data in storage devices 108 conforms to constraints provided by the learning metadata stored in the virtual logical unit 114.

Therefore, FIGS. 1-6 illustrate certain embodiments in which learning metadata is synchronized across storage servers by using copy services commands The learning metadata is stored in one or more virtual logical units shared among a plurality of storage clusters.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
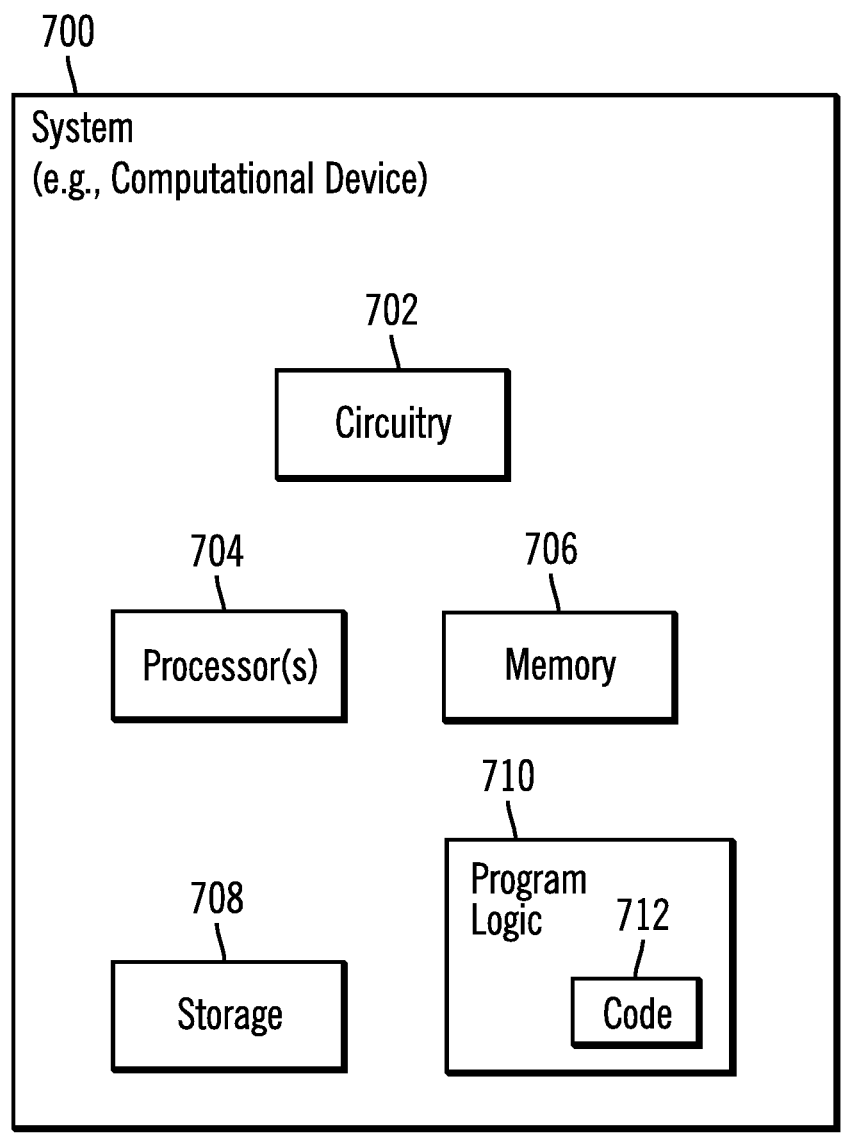
FIG. 7 illustrates a block diagram of a computational system that shows certain elements that may be included in the first and the second storage servers of FIGS. 1 and 3, in accordance with certain embodiments.

FIG. 7 illustrates a block diagram that shows certain elements that may be included in the system 700 in accordance with certain embodiments. The system 700 may comprise the storage servers 102, 302 and the storage clusters 104, 106, 308, 310 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

In certain embodiments, the storage servers 102, 302 of FIG. 1 and FIG. 3 may be cloud component parts included in a cloud computing environment. In the cloud computing environment the systems architecture of the hardware and software components involved in the delivery of cloud computing may involve a plurality of cloud components communicating with each other. For example, in certain embodiments, storage servers 102, 302 may provide clients, and other servers and software and/or hardware components in the networked cloud with storage and data processing services.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method implemented in a cloud computing environment comprised of a first storage server and a second storage server, the method comprising:
    copying, a virtual logical unit that stores learning metadata, from the first storage server to the second storage server, wherein the learning metadata indicates a type of storage device in which data of the first storage server is stored;
    copying logical units corresponding to the data from the first storage server to the second storage server; and
    using the learning metadata to place a selected data in the type of storage device indicated by the learning metadata, subsequent to the copying of the logical units and subsequent to the copying of the virtual logical unit.

2. The method of claim 1, wherein a copy services command synchronizes the learning metadata across storage servers prior to the copying of the logical units corresponding to the data from the first storage server to the second storage server.

3. The method of claim 1, wherein the learning metadata additionally indicates how the selected data is physically placed in different storage areas of the type of storage device indicated by the learning metadata.

4. The method of claim 3, wherein the learning metadata also indicates constraints on read and write access times for the selected data, and wherein while placing the selected data in the type of storage device indicated by the learning metadata, the selected data is also placed in a manner such that the constraints on the read and write access times are satisfied.

5. The method of claim 1, wherein
    a synchronous copy services command allows copying of selected logical units from one storage server to another; and
    the virtual logical volume that stores the learning metadata is not accessible to customers that store customer data in the first and the second storage servers.

6. A system, comprising:
    a cloud computing environment comprising a first storage server and a second storage server, wherein operations performed in the cloud computing environment comprise:
        copying, a virtual logical unit that stores learning metadata, from the first storage server to the second storage server, wherein the learning metadata indicates a type of storage device in which data of the first storage server is stored;
        copying logical units corresponding to the data from the first storage server to the second storage server; and
        using the learning metadata to place a selected data in the type of storage device indicated by the learning metadata, subsequent to the copying of the logical units and subsequent to the copying of the virtual logical unit.

7. The system of claim 6, wherein a copy services command synchronizes the learning metadata across storage servers prior to the copying of the logical units corresponding to the data from the first storage server to the second storage server.

8. The system of claim 6, wherein the learning metadata additionally indicates how the selected data is physically placed in different storage areas of the type of storage device indicated by the learning metadata.

9. The system of claim 8, wherein the learning metadata also indicates constraints on read and write access times for the selected data, and wherein while placing the selected data in the type of storage device indicated by the learning metadata, the selected data is also placed in a manner such that the constraints on the read and write access times are satisfied.

10. The system of claim 6, wherein
    a synchronous copy services command allows copying of selected logical units from one storage server to another; and
    the virtual logical volume that stores the learning metadata is not accessible to customers that store customer data in the first and the second storage servers.

11. A computer program product for a cloud computing environment comprised of a first storage server and a second storage server, the computer program product comprising:
    a non-transitory computer readable storage medium having computer readable program code embodied therewith, the computer readable program code configured to perform operations that are executed by a processor, the operations comprising:
        copying, a virtual logical unit that stores learning metadata, from the first storage server to the second storage server, wherein the learning metadata indicates a type of storage device in which data of the first storage server is stored;
        copying logical units corresponding to the data from the first storage server to the second storage server; and
        using the learning metadata to place a selected data in the type of storage device indicated by the learning metadata, subsequent to the copying of the logical units and subsequent to the copying of the virtual logical unit.

12. The computer program product of claim 11, wherein a copy services command synchronizes the learning metadata across storage servers prior to the copying of the logical units corresponding to the data from the first storage server to the second storage server.

13. The computer program product of claim 11, wherein the learning metadata additionally indicates how the selected data is physically placed in different storage areas of the type of storage device indicated by the learning metadata.

14. The computer program product of claim 13, wherein the learning metadata also indicates constraints on read and write access times for the selected data, and wherein while placing the selected data in the type of storage device indicated by the learning metadata, the selected data is also placed in a manner such that the constraints on the read and write access times are satisfied.

15. The computer program product of claim 11, wherein
a synchronous copy services command allows copying of selected logical units from one storage server to another; and
the virtual logical volume that stores the learning metadata is not accessible to customers that store customer data in the first and the second storage servers.

* * * * *